April 26, 1966     T. W. WILCOX     3,248,611
ELECTRIC SWITCHGEAR

Filed Oct. 30, 1962     3 Sheets-Sheet 1

INVENTOR
THOMAS W. WILCOX

BY
ATTORNEYS

April 26, 1966    T. W. WILCOX    3,248,611
ELECTRIC SWITCHGEAR

Filed Oct. 30, 1962    3 Sheets-Sheet 3

INVENTOR
THOMAS W. WILCOX

BY
Watson, Cole, Grindle & Watson
ATTORNEYS

United States Patent Office 3,248,611
Patented Apr. 26, 1966

3,248,611
ELECTRIC SWITCHGEAR
Thomas Webster Wilcox, Whitley Bay, Northumberland, England, assignor to Merz and McLellan Services Limited, Newcastle-upon-Tyne, England, a company of Great Britain
Filed Oct. 30, 1962, Ser. No. 234,203
Claims priority, application Great Britain, Nov. 1, 1961, 39,185/61
9 Claims. (Cl. 317—103)

This invention relates to electric switchgear and is concerned with the provision of an improved layout suitable for high voltages, for example 275 kv., which will provide an inexpensive and compact form of enclosed switchgear.

In some respects the invention is cognate with or a modification of that set forth in the present applicant's copending U.S. application Ser. No. 225,687 for "Electric Switchgear," filed Sept. 24, 1962, which describes inter alia a switchgear assembly comprising a number of alia a switchgear assembly comprising a number of cells separated by partitions lying generally perpendicular to a plane, each set of switchgear for each phase being mounted is a separate cell which may be of rectangular section separated by vertical and horizontal partitions. In the arrangements more particularly described in the specification referred to the system includes a set of switchgear for each base of main bus conductors and each phase of reserve bus conductors, the sets of switchgear lying generally in a plane with the sets corresponding to the bases of the main bus conductors interleaved between those corresponding to the phases of the reserve bus conductors. Hence in the construction described the main and reserve bus-bars of all phases lie in a plane with the main bus-bar and the reserve bus-bar associated with each phase adjacent to each other.

According to one aspect of the present invention a switchgear assembly includes for each phase two bus-conductors on opposite sides of a longitudinal plane, and two sets of switchgear, one associated with each bus conductor, and each extending generally parallel to the longitudinal plane, the bus conductors being offset from one another so that each bus conductor and its associated switchgear lie on opposite sides of a transverse plane perpendicular to the longitudinal plane, connecting means such as isolators being provided to pass through the longitudinal plane to connect each set of switchgear to the other bus conductor.

The assembly comprising two sets of switchgear and two bus conductors for one phase, may be followed, in a direction perpendicular to the longitudinal plane, by similar assemblies for other phases, so as to form what may be termed a polyphase array comprising two bus conductors and two circuits for each phase arranged vertically in a house.

A number of such arrays may be placed side by side in the house, the bus conductors being afforded by bus-bars extending parallel to the intersection of the longitudinal and transverse plane referred to above.

In one particular arrangement the switchgear associated with each bus conductor extends in a direction normal to the transverse plane.

Connecting means, such as isolators, may then be provided between neighbouring slabs for connecting together their corresponding outlet terminals so that both circuits can be connected to a bus-bar through a single set of switchgear, the other set being bypassed for maintenance or repair.

In one arrangement different sets of switchgear of different circuits of a phase are accommodated in spaces which will be termed unit blocks, separated from other such blocks by a number of parallel planes perpendicular to both the longitudinal and transverse planes.

The planes separating the blocks may merely be imaginary geometrical planes but preferably the blocks are separated by partitions forming short cells on the same side of the transverse plane as the bus-bar, and long cells on the opposite side. In some cases the partitions may comprise solid walls, whilst in other cases some of them may be constituted by an earthed screen for example of wire mesh. Conveniently the long cell on one side of a bus-bar is alternated in the direction of the transverse plane with a short cell on the same side of the companion bus-bar and these cells are devoted to a single circuit. The long cell may house a circuit-breaker and accommodation for all or part of isolators for connecting the circuit-breaker to the two associated bus-bars whilst an isolator extending between the long cell and the short cell may serve to connect the circuit-breaker to an outlet terminal in the latter cell.

Conveniently four isolators may be provided interconnecting four points generally situated on the corners of a parallelogram, e.g. a square, the points being situated one at an end of each of the sets of switch-gear and one on each bus conductor. Moreover it may be arranged that each set of switchgear can be connected at its other end by a further isolator to a circuit terminal, and the said further isolator may extend either through the longitudinal plane or parallel to it.

In another particular arrangement the switchgear associated with each bus conductor extends in a direction parallel to the transverse plane.

In order to make use of available space and to reduce building costs, the circuit-breaker may be mounted on the floor, or project downwards from the ceiling, or may be mounted at a convenient angle from the wall or ceiling.

With the last of these arrangements the circuit-breaker may be mounted at the junction of a wall and floor or of a wall and ceiling.

The invention may be performed in various ways, but one specific embodiment will be described by way of example with reference to the accompanying drawings in which.

Figure 1:
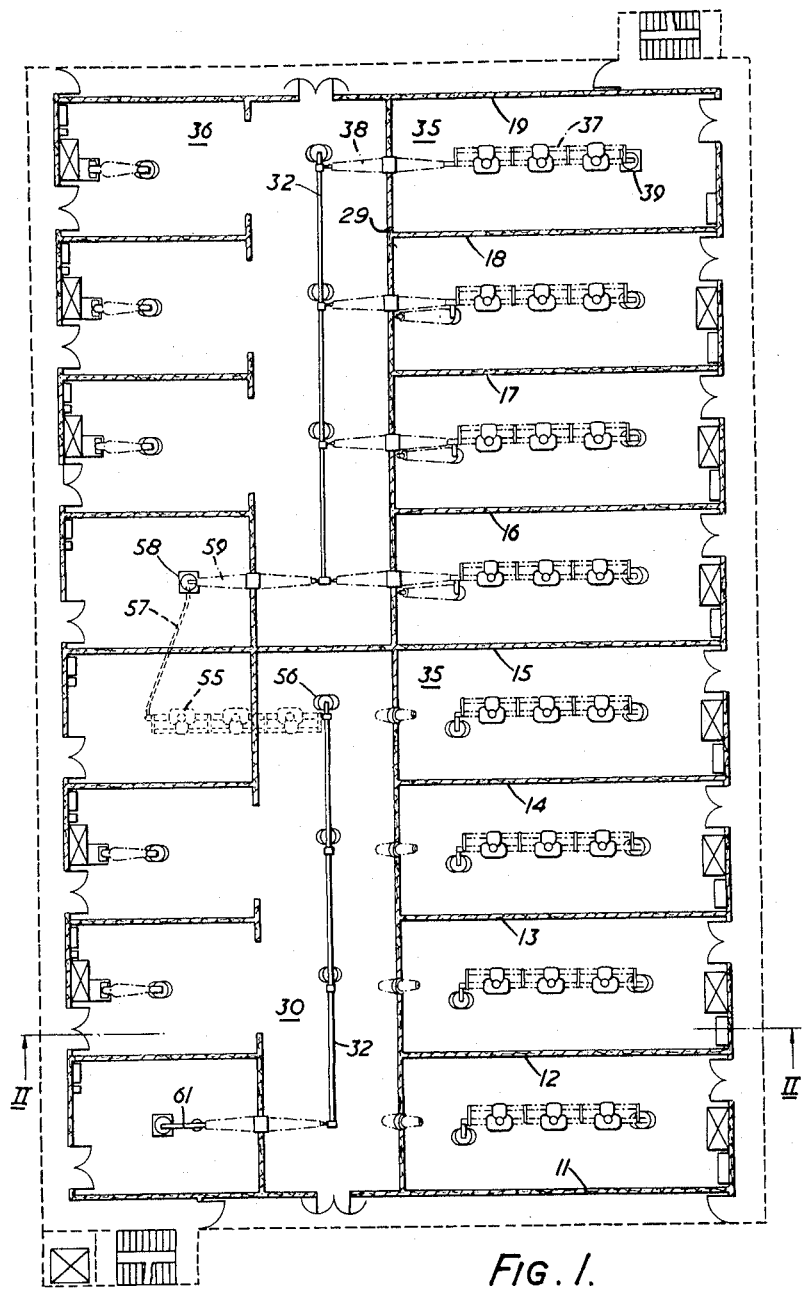
FIGURE 1 is a plan view of a switching station for a 275 kv. system with the roof removed.

The station is generally similar to that described in the specification referred to above, being housed in a building which is divided into a number of elongated cells of rectangular section by vertical and horizontal partitions. With an arrangement embodying eight polyphase arrays as described above there are nine vertical partitions 11 to 19 including the outer walls, and seven horizontal partitions 21 to 27 including the floor 21 and roof 27.

The building is divided in half by a central vertical partition wall 29 perpendicular to the partitions 11 to 19. Each of the vertical partitions 12 to 18 is interrupted on one or other side of the central wall 29 to form bus-bar passageways 30 and 31 extending horizontally at right angles to the length of the cells.

Figure 2:
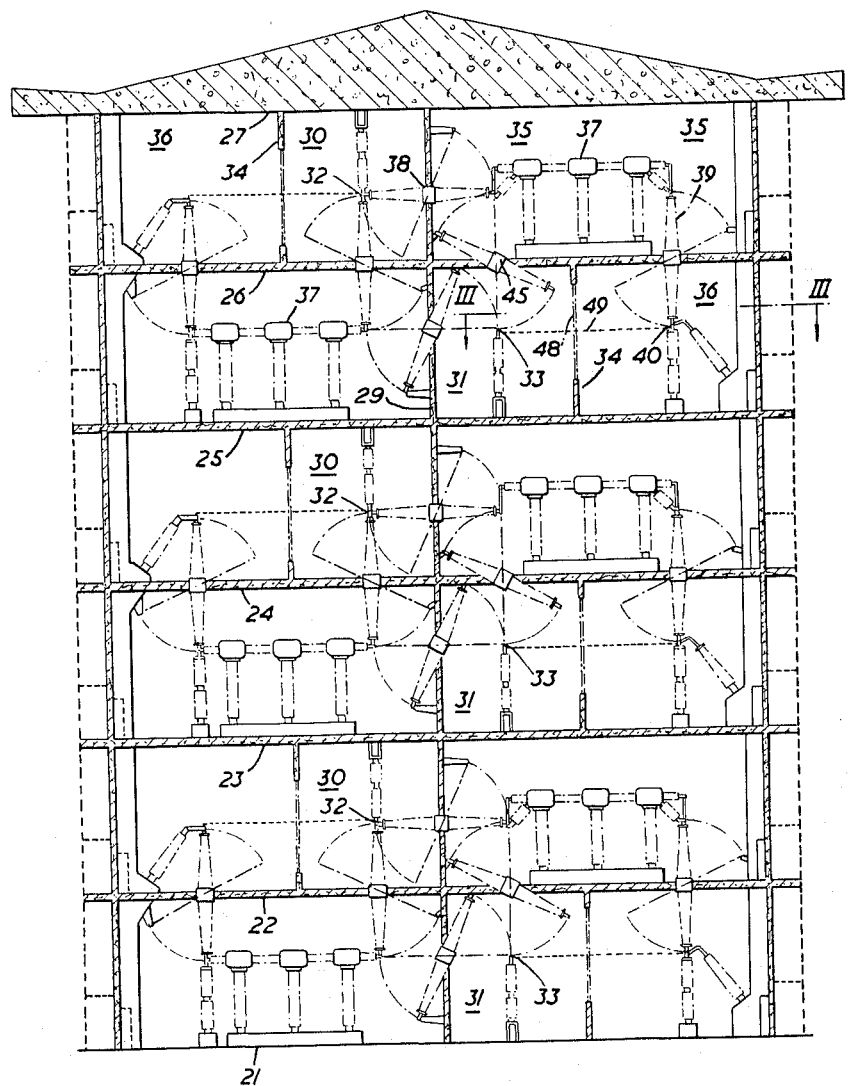
FIGURE 2 is a sectional elevation on the line II—II of FIGURE 1.

The bus-bar passages are arranged in a staggered formation. Thus the passages 30 containing the main bus-bars 32 occupying the second, fourth and sixth horizontal stories, are displaced in one direction (to the left in FIGURE 2) from the central wall 29, whilst the passages 31 containing the reserve bus-bars 33, occupying the first, third and fifth stories, are displaced in the opposite direction (to the right in FIGURE 2) from the central wall. Accordingly there will be a comparatively long cell 35 on one side of a bus-bar passage 30 separated from it by the central wall 29, and a shorter one 36 on the opposite side, separated from it by a wall 34. The long cell is occupied by a circuit-breaker 37, whilst the short cell constitutes a terminal compartment for the circuit outlet which includes the circuit-breaker above or below it. Thus, for example, a phase of the main bus-bar 32 is connected through a horizontal isolator 38 to a circuit-breaker terminal at the same level. A circuit-breaker terminal on the other side of the circuit-breaker can then be connected by an isolator 39 extending vertically downwards through the floor to a circuit outlet terminal 40 in the short cell 36 below. The circuit outlet terminal is connected through a bushing 41 incorporating a current transformer and extending into or through the end wall to the outgoing feeder.

In addition to being provided with a horizontal isolator 38 for connecting it to the main bus-bar 32 the circuit-breaker terminal adjacent the bus-bar is also provided with a vertical isolator 45 by which it can be connected vertically to the reserve bus-bar 33. Thus the two bus-bars 32 and 33 of a phase lie at two opposite corners of a square whilst the two circuit-breaker terminals lie at the other two opposite corners of the square. Each of the four isolators 38 and 45, when in its closed position, extends substantially along one side of the square.

The isolators are preferably of rocking bushing type as indicated diagrammatically in the drawings, but in certain cases if desired some at least of the isolators could be of rotating post type mounted alongside a large opening in a partition which can be closed by a folding door when the isolator is in the open position.

The partition wall 34 separating the bus-bar passage from an adjacent short cell at the same level, that is to say from the outlet terminal compartment normally associated with the companion bus-bar, may have in it a large opening normally closed by folding doors 48. This enables a temporary bypass connection 49 to be secured between the bus-bar and the circuit terminal, thereby by-passing the circuit-breaker associated with that terminal.

In order to install this connection the bus-bar will, of course, be isolated and the circuit terminal will also be isolated. The companion bus-bar will be connected to the supply and a bus coupler switchgear set will be relied upon to serve the outgoing circuit whose circuit-breaker is bypassed for purposes of maintenance.

Figure 3:
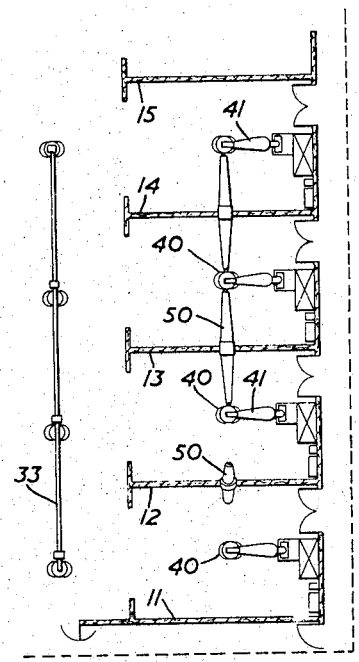
FIGURE 3 is a partial sectional plan view on the lines III—III of FIGURE 2 showing isolators for connecting adjacent circuit terminals together.

As shown in FIGURE 3 horizontal isolators 50 are also provided extending horizontally parallel to the bus-bars through the vertical partitions between neighbouring circuit outlet terminals. By closing such an isolator two circuit outlet terminals can be connected together so as to employ the same circuit-breaker, and the other circuit-breaker can be bypassed and isolated by opening the isolators on either side of it, for maintenance or repair.

Certain pairs of cells are devoted to bus couplers and bus sections. Thus a bus section equipment, as indicated partly in dotted lines in FIGURE 1, may occupy two horizontally adjacent long cells and a short cell above one of them. The other long cell contains the circuit-breaker 55 connected at one end by a vertical bushing isolator 56 to one bus-bar section. Its other end is connected by a straight through conductor 57 extending into the other long cell, a bushing insulator 58 passing up through the floor to the short cell and finally a horizontal rocking bushing isolator 59 to the other section of the bus-bar.

In the case of a bus coupler a pair of cells one above the other will be employed, of which the long cell (as at the top right hand corner of FIGURE 1) houses a circuit-breaker and the short cell (as at the bottom left hand corner of FIGURE 1) houses a through conductor 61, in each case connected to the associated bus-bar through an isolator.

Many of the details and advantages described in the companion specification referred to above, including the manner in which the circuit outlet terminals may be connected to cables or overhead lines, apply equally to the present arrangement, and it is not thought necessary to repeat the description herein.

What I claim is:

1. A polyphase electric switchgear assembly in which each phase is accommodated in two spaces, termed layers, on opposite sides of a longitudinal plane and includes two bus conductors, one in each layer, on opposite sides of a transverse plane perpendicular to the longitudinal plane, and two sets of switchgear, also on opposite sides of the transverse plane, each including a busbar connecting terminal on the opposite side of the transverse plane from the bus conductor in the same layer, means extending through the transverse plane for connecting each busbar connecting terminal to the bus conductor in the same layer, and means extending through the longitudinal plane for connecting each busbar connecting terminal to the bus conductor in the other layer, wherein the busbar connecting terminals lie a two opposite corners of a parallelogram and the bus conductors lie at the other two opposite corners, and the means for connecting the busbar connecting terminals to the bus conductors comprise isolators pivotably movable into open and closed positions.

2. A polyphase electric switchgear assembly comprising a plurality of phases accommodated in spaces, termed layers, separated by a number of parallel planes, in which each phase lies in two adjacent layers on opposite sides of one of the said planes termed a longitudinal plane, and includes two bus conductors, one in each layer, on opposite sides of a transverse plane which is perpendicular to the longitudinal plane and common to all the phases, and two sets of switchgear, also on opposite sides of the transverse plane, each including a busbar connecting terminal on the opposite side of the transverse plane from the bus conductor in the same layer, means extending through the transverse plane for connecting each busbar connecting terminal to the bus conductor in the same layer, and means extending through the longitudinal plane for connecting each busbar connecting terminal to the bus conductor in the other layer.

3. A polyphase electric switchgear assembly in which each phase is accommodated in two spaces, termed layers, on opposite sides of a longitudinal plane and includes two busbars, one in each layer, situated on opposite sides of a transverse plane perpendicular to the longitudinal plane, and two rows of sets of switchgear, also on opposite sides of the transverse plane, each busbar and each row of switchgear extending parallel to the intersection of the longitudinal and transverse planes, each set of switchgear including a busbar connecting terminal on the opposite side of the transverse plane from the busbar in the same layer, means extending through the transverse plane for connecting each busbar terminal to the busbar in the same layer, and means extending through the longitudinal plane for connecting each busbar connecting terminal to the busbar in the other layer.

4. An assembly as claimed in claim 3 in which the sets of switchgear are accommodated in spaces, which will be termed unit blocks, separated by normal planes perpendicular to the said intersection, each unit block including one set of switchgear of each row in which neighboring sets of switchgear in a row are separated by partitions lying in the same normal planes and forming compartments each containing one set of switchgear.

5. An assembly as claimed in claim 3 in which that part of one layer lying on one side of the transverse plane is divided into a busbar cell adjacent the transverse plane and a short cell spaced from the transverse plane by the busbar cell, while that part of the other layer of the block lying on the same side of the transverse plane comprises a long cell corresponding to the combined length of the short cell and the busbar cell.

6. An assembly as claimed in claim 5 in which each set of switchgear includes a circuit-breaker in the long cell having its terminals spaced apart in a direction generally perpendicular to the transverse plane.

7. An assembly as claimed in claim 5 in which each set of switchgear includes a circuit-breaker in the long cell and a circuit outlet terminal in the short cell.

8. An assembly as claimed in claim 7 in which the means for connecting the busbar connecting terminals to the busbars comprise isolators pivotably movable into open and closed positions and said long cell houses a circuit-breaker and accommodation for at least part of said isolators for connecting the circuit-breaker to the two associated busbars while a further isolator extending between the long cell and the short cell serves to connect the circuit-breaker to a circuit outlet terminal in the latter cell.

9. An assembly as claimed in claim 8 in which the long cells are divided from the short cells by a fixed wall, and the isolator extending between them is of pivoted bushing type and extends through the wall.

References Cited by the Examiner

UNITED STATES PATENTS

| | | | |
|---|---|---|---|
| 889,358 | 9/1908 | Valkenburg | 317—103 |
| 1,454,744 | 5/1923 | Jamieson | 317—103 |

FOREIGN PATENTS

| | | |
|---|---|---|
| 1,129,584 | 7/1956 | Germany. |

KATHLEEN H. CLAFFY, *Primary Examiner.*

JOHN F. BURNS, LARAMIE E. ASKIN, DARRELL L. CLAY, *Examiners.*